(12) United States Patent
O'Neil

(10) Patent No.: US 6,220,614 B1
(45) Date of Patent: Apr. 24, 2001

(54) JUMPING BIKE

(76) Inventor: David S. O'Neil, 4241 Centurian Cir., Greenacres, FL (US) 33463

( * ) Notice: Subject to any disclaimer, the term of this patent is extended or adjusted under 35 U.S.C. 154(b) by 0 days.

(21) Appl. No.: 09/146,809

(22) Filed: Sep. 4, 1998

(51) Int. Cl.$^7$ .............................. B62K 19/00; B62M 1/10
(52) U.S. Cl. .................... 280/220; 280/278; 280/281.1
(58) Field of Search .............................. 280/201, 220, 280/278, 287, 274, 281.1, 215, 1.191, 229

(56) References Cited

U.S. PATENT DOCUMENTS

| | | | |
|---|---|---|---|
| 4,212,480 | * | 7/1980 | Mikina et al. ........................ 280/220 |
| 4,226,435 | * | 10/1980 | Efros .................................... 280/201 |
| 4,582,335 | * | 4/1986 | Paioli et al. ......................... 280/287 |
| 4,909,537 | * | 3/1990 | Tratner ................................ 280/287 |
| 5,860,660 | * | 1/1999 | Garcia ................................. 280/201 |

FOREIGN PATENT DOCUMENTS

| | | | |
|---|---|---|---|
| 459508 | * | 11/1913 | (FR) .................................... 280/201 |
| 453085 | * | 11/1949 | (IT) ..................................... 280/220 |

* cited by examiner

*Primary Examiner*—Anne Marie Boehler

(57) ABSTRACT

An improved bicycle includes a selective positioning system for providing rider-controlled vertical movement of a passenger support construction relative to the bicycle wheels. The bicycle employs an energy conversion construction that converts rotational energy from one of the bicycle wheels into translational energy. This translational energy is utilized by cooperative lifting assemblies to move the passenger support construction.

12 Claims, 5 Drawing Sheets

JUMPING BIKE

FIELD OF THE INVENTION

This invention is directed to improvements in bicycles and, in particular, to a bicycle having a rider-controlled system that raises and lowers a rider-supporting section during transit.

BACKGROUND OF THE INVENTION

Bicycles are a popular and efficient form of transportation that allow riders to travel over long distances with relative ease. Bicycles are also environmentally friendly and allow riders to exercise while they travel. As bicycle designs have progressed, numerous improvements have been implemented to enhance various aspects of bicycle performance.

Some modifications, like multi-gear drive systems, make bicycles easier to operate over hills and during periods of heavy wind. Additionally, new seat designs have made bicycles more comfortable, increasing the distance they may be ridden. Some bicycles, like recumbents, even allow riders to assume a reclined orientation during travel. Other bicycles include provisions to accommodate more than one rider simultaneously. Still other bicycles, like those of U.S. Pat. No. 4,400,003 and U.S. Pat. No. 5,052,706 have components that are selectively collapsible to promote easy storage and safe shipping.

In addition to providing a practical means of transportation and a convenient source of exercise, bicycles are often used as a source of entertainment. For example, many riders explore rocky terrain on so-called "mountain bikes." This type of bicycle typically includes a shock absorbing suspension system that improves control over uneven surfaces. Suspension systems reduce rider fatigue by absorbing impacts that would otherwise be transmitted directly to the rider. An example of a suspension-including bicycle is disclosed in U.S. Pat. No. 5,658,001.

Mountainous terrain is not the only location traversed by thrill-seeking bicycle riders, however. Many riders choose the bicycle as a means of simulating temporary flight. Typically, this flight experience involves riding a bicycle at high speed up, onto, and over an inclined ramp. The bicycle's momentum carries the bicycle and rider through the air.

Ramp jumping, although thrilling, can be very dangerous; a wide variety of variables affect the outcome of a given jump. For example, approach speed, ramp angle, and even tire pressure must all be within given acceptable ranges for a jump to be successful. Misjudgment, lack of concentration, or poorly maintained equipment may all lead to a failed jump, resulting in possible injury or even death. As a result, ramp jumping is not an activity that is safe for all riders.

Regardless of the dangers involved, many bicycle riders attempt ramp jumping as a pastime. In addition, television promotes such events making it alluring to even the most unsophisticated riders. Unfortunately, few riders have the requisite knowledge and skill to jump ramps successfully. Many riders are injured because they perform jumps without understanding the dynamics involved. To make matters worse, most bicycle modifications do not make ramp jumping safer.

U.S. Pat. No. 5,301,969 is one known disclosure that provides a dual frame bicycle for purposes of jump simulation. The bicycle converts rotational energy from the bicycle back wheel into translational energy used to make the bicycle leap. The '969 device is formed from two frames and employs a hooked pole that selectively engages a pin affixed to the bicycle rear wheel. The two bicycle frames are spaced apart by elastic members, and using the hooked pole to engage the rear wheel pin draws the two frames together, storing potential energy in the elastic members. The pole remains hooked to the wheel pin while until the wheel has rotated a predetermined distance, at which point the hook is released. When the hook is released, the energy stored in the elastic members is released, forcing the bicycle frames apart and causing the bicycle to jump.

The '969 requires a two frame construction that is cost prohibitive and, once the bicycle begins to store energy, a jump is unavoidable. Even if it were possible to wrench the hook free from the wheel pin before the wheel had rotated through the hook-releasing distance, the already-stored energy would still be released. As a result, a rider attempting to abort a jump will still be lifted before coming to rest. This design also makes it difficult for a rider to increase or decrease the amount of lift, as needed. The '969 produces consistent amounts of lift which may not be appropriate for all situations during a given bicycle ride.

What is lacking in the prior art is a single frame bicycle that allows a rider to experience the thrill of jumping, without requiring the rider to undergo the equipment preparation and skill set development associated with jumping over a ramp. The bicycle should provide a rider-controlled positioning means for raising the rider from a standard position to an elevated position and then safely returning him to the standard position. The bicycle should be able to elevate the rider without requiring that the bicycle become airborne. The bicycle should be customizable to provide varying degrees of lift to suit riders of different stature. The bicycle should also be customizable to provide different lifting characteristics, including varied lift rates and lift heights.

SUMMARY OF THE INVENTION

The instant invention is a bicycle having a user-controlled selective positioning system that allows the rider to adjust the height of a rider-supporting portion of the bicycle frame, with respect to the remainder of the bicycle. The bicycle includes a passenger support construction linked to a front and rear tire by wheel mounting assemblies located at opposite end of the support construction. A seat is mounted on the passenger support construction, and the height of the entire passenger support construction is adjustable with respect to the remainder of the bicycle during transit. Appropriate brakes are included in each embodiment, to slow the bicycle as needed.

The height of the passenger support construction is temporarily adjusted by a rider-controlled selective positioning system. The positioning system includes an energy transfer construction that converts rotational energy from the bicycle wheels into translational energy capable of lifting the rider. A network of cables directs the converted energy to lifting assemblies that operatively link the passenger support construction to the above-mentioned wheel mounting assemblies. As a result, the positioning system produces relative motion between the passenger support construction and the bicycle wheels. With this arrangement, the instant invention will elevate a rider without requiring the entire bicycle to become airborne.

Thus, an objective of the instant invention is to provide a single frame bicycle that selectively elevates, and subsequently lowers, a rider without requiring that the entire bicycle become airborne.

Another objective of the instant invention is to provide a bicycle that allows a rider to enjoy the thrill of ramp jumping without requiring a ramp or other additional equipment.

A further objective of the instant invention is to provide a bicycle that allows a rider to simulate a ramp jumping experience without requiring the preparation and skill set development associated with successful ramp jumping.

Still an additional objective of the instant invention is to provide a bicycle that provides a rider-controlled positioning means for raising the rider from a standard position to an elevated position and then safely returning him to the standard position.

Yet a further objective of the instant invention is to provide a bicycle that is customizable to provide varying degrees of lift to suit riders of different stature.

An additional objective of the instant invention is to provide a bicycle that is customizable to provide different lifting characteristics, including varied lift rates and lift heights.

Still another objective of the instant invention is to provide a bicycle that includes a positioning system which does not interfere with the steering of the bicycle.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
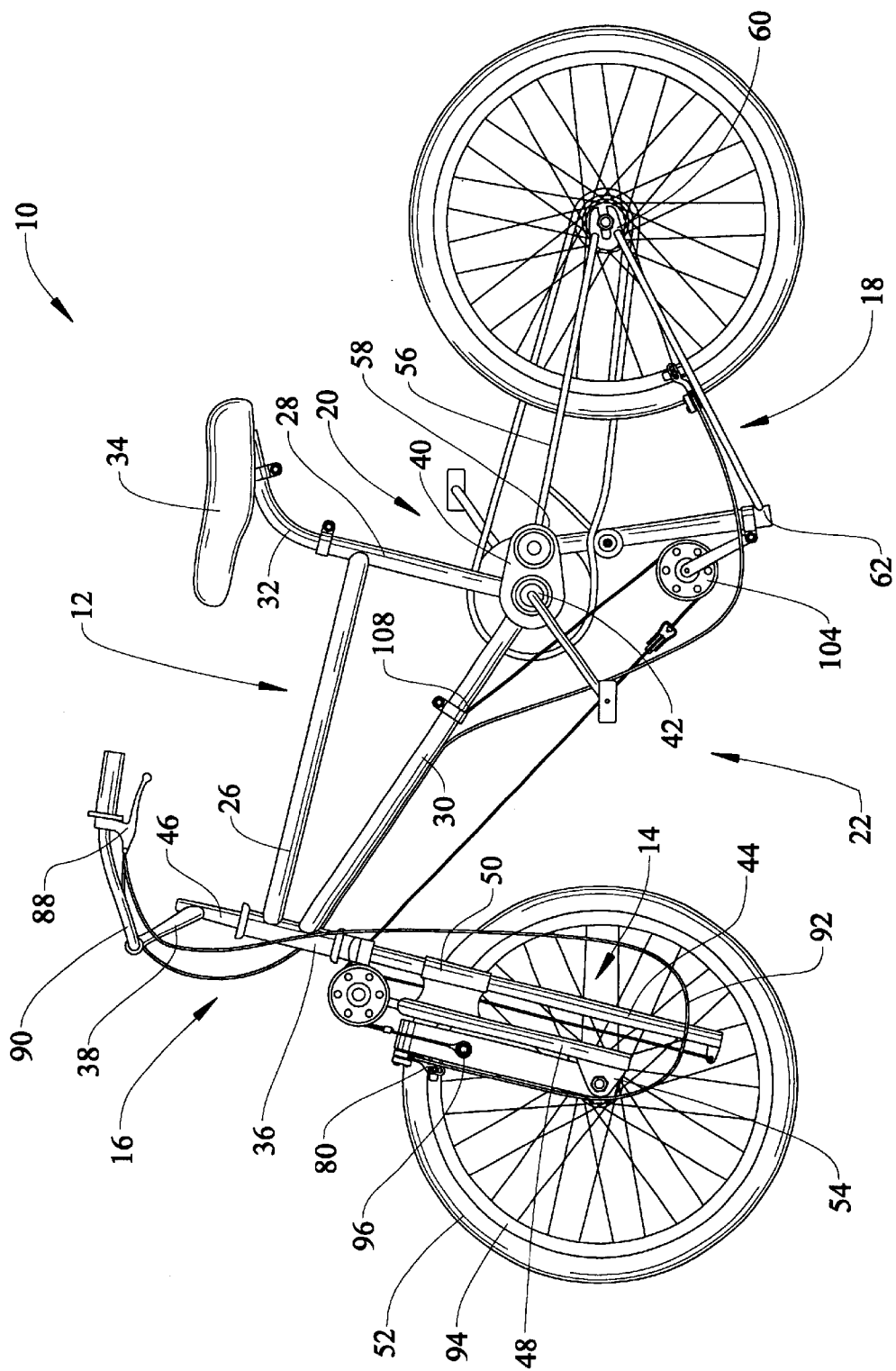
FIG. 1 is a side elevation view of an improved bicycle according to the present invention, with the included passenger support construction in a standard orientation.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Now with reference to FIG. 1, the bicycle 10 of a first embodiment is shown. By way of overview, the bicycle 10 includes a passenger support construction 12 having a first wheel mounting assembly 14 disposed at a first end 16 thereof. A second wheel mounting assembly 18 is disposed at a second end 20 of the passenger support construction 12. The bicycle 10 also includes a selective positioning system 22 that maneuvers the support construction 12 into a user-selected orientation with respect to the bicycle support surface. The details of the bicycle 10 will now be discussed.

Figure 3:
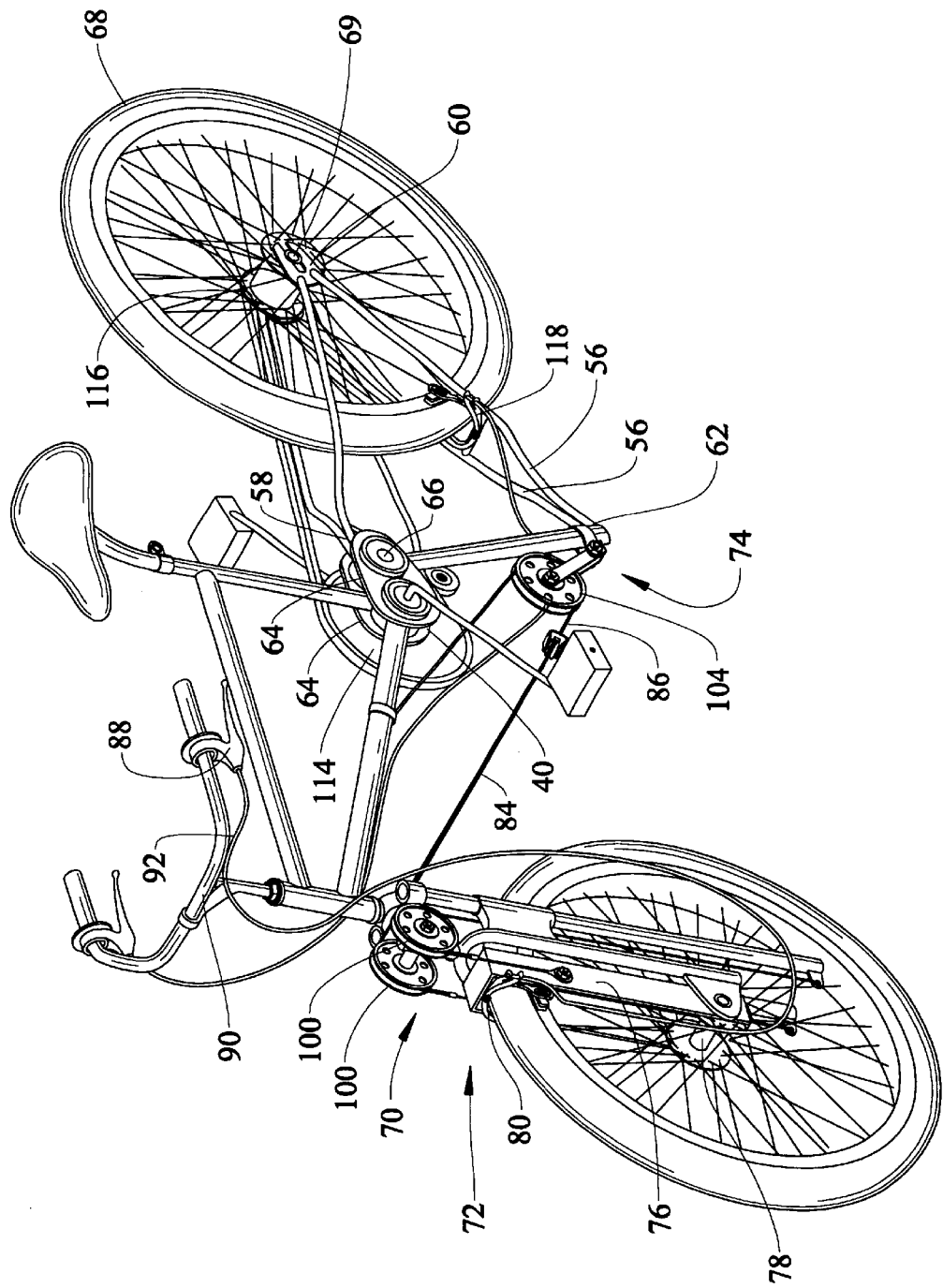
FIG. 3 is a pictorial view of the bicycle shown in FIG. 1.

With additional reference to FIG. 3, the passenger support construction 12 is an essentially-triangular truss characterized by a top tube 26, a seat tube 28, and a down tube 30. The top tube 26 abuts the seat tube 28, and the down tube 30 extends between the top tube and the seat tube. A seat post 32 extends upward from within the seat tube 28, and a passenger-supporting seat 34 is disposed on a free end of the seat post. The juncture of the top tube 26 and the down tube 30 is characterized by a substantially-hollow head tube 36. The head tube 36, which is essentially a cylindrical sleeve, accommodates a standard handlebar support post 38. In a preferred embodiment, the juncture of the down tube 30 and the seat tube 28 is characterized by a bottom bracket 40 in which a pedal crankset 42 is rotatably mounted.

Figure 2:
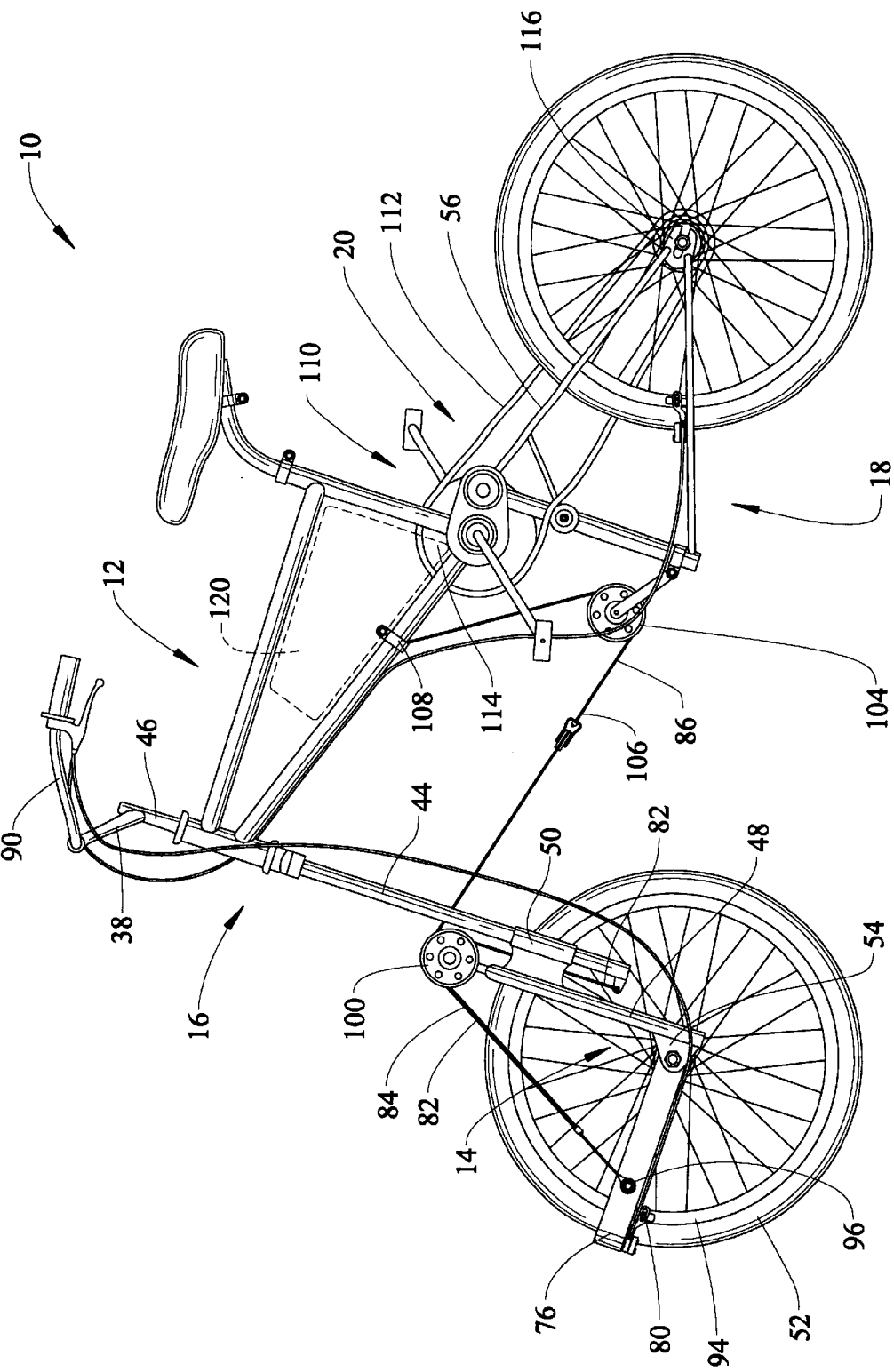
FIG. 2 is a side elevation view of the bicycle shown in FIG. 1, with the passenger support construction in an elevated orientation; and the motor in phantom lines

As shown in FIGS. 1 and 2, the bicycle 10 also includes wheel mounting assemblies 14,18 mounted at opposite ends 16,20 of the passenger support construction 12. The first wheel mounting assembly 14 includes a steering fork 44 having a first end 46 that is rigidly linked to the handlebar support post 38. A wheel fork 48 is slidably attached to the legs of the steering fork 44. More particularly, the wheel fork 48 and steering fork 44 are joined by a linking sleeve 50 attached to the wheel fork. The linking sleeve 50 allows relative motion between the steering fork 44 and the wheel fork 48; the steering fork slides within the linking sleeve. A front wheel 52 is rotatably secured to the wheel fork 48 via front mounting flanges 54 that extend from the bottom of the wheel fork.

Figure 4:
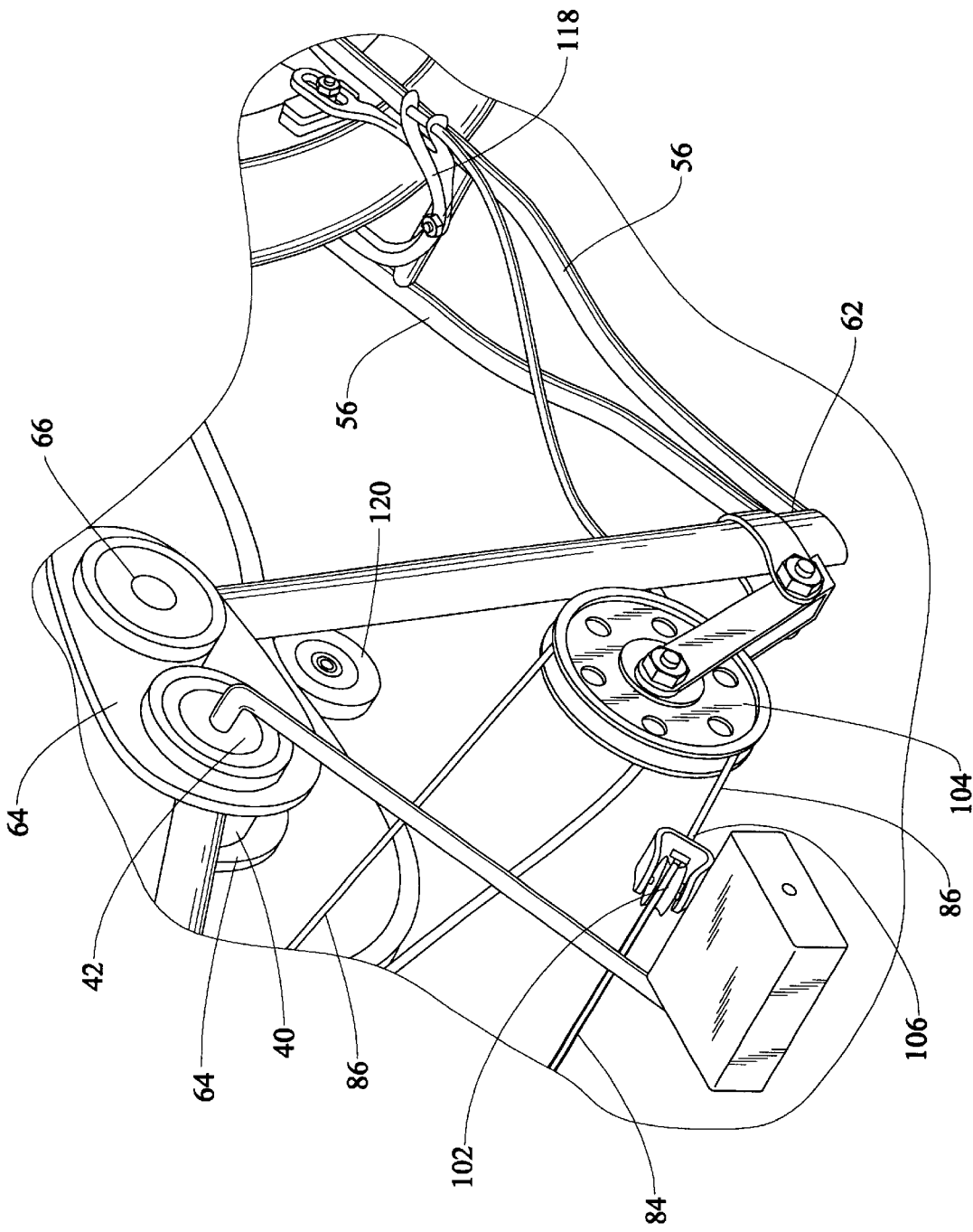
FIG. 4 is a close-up pictorial view of the bicycle shown in FIG. 1.

As seen with joint reference to FIGS. 3 and 4, the second wheel mounting assembly 18 includes a pair of congruent triangular trusses 56 having an attachment vertex 58, a wheel engaging vertex 60, and a control vertex 62. The second wheel mounting assembly 18 is pivotally joined to the passenger support construction 12 via a pair of rigid joint plates 64 extending from the bottom bracket 40. More specifically, the attachment vertex 58 is rotatably mounted on a support cylinder 66 that extends orthogonally between the joint plates 64. The rear wheel 68 is mounted on a rear axle 69 that extends between the wheel engaging vertex 60 of each truss 56. As a result, during lifting of the passenger support construction 12, the second wheel mounting assembly 18 and the rear wheel 68 pivot as a unit with respect to the passenger support construction second end 20. The second wheel attachment assembly 18 may include trusses of various geometry, as desired.

As mentioned above, the bicycle 10 also includes a selective positioning system 22 that allows a rider to raise and lower the passenger supporting construction 12 with respect to the wheels 52,68. In keeping with the objects of the present invention, the selective positioning system 22 advantageously converts rotational energy form the front wheel 52 into translational energy capable of raising the passenger support construction 12.

As shown in FIG. 3, the selective positioning system 22 includes an energy transfer construction 70 that is operatively linked to a first lifting assembly 72 and a second lifting system 74. The first and second lifting systems 72,74 are responsible for vertical motion of the front and rear 16,20 portions of the passenger support construction 12, respectively.

Figure 5:
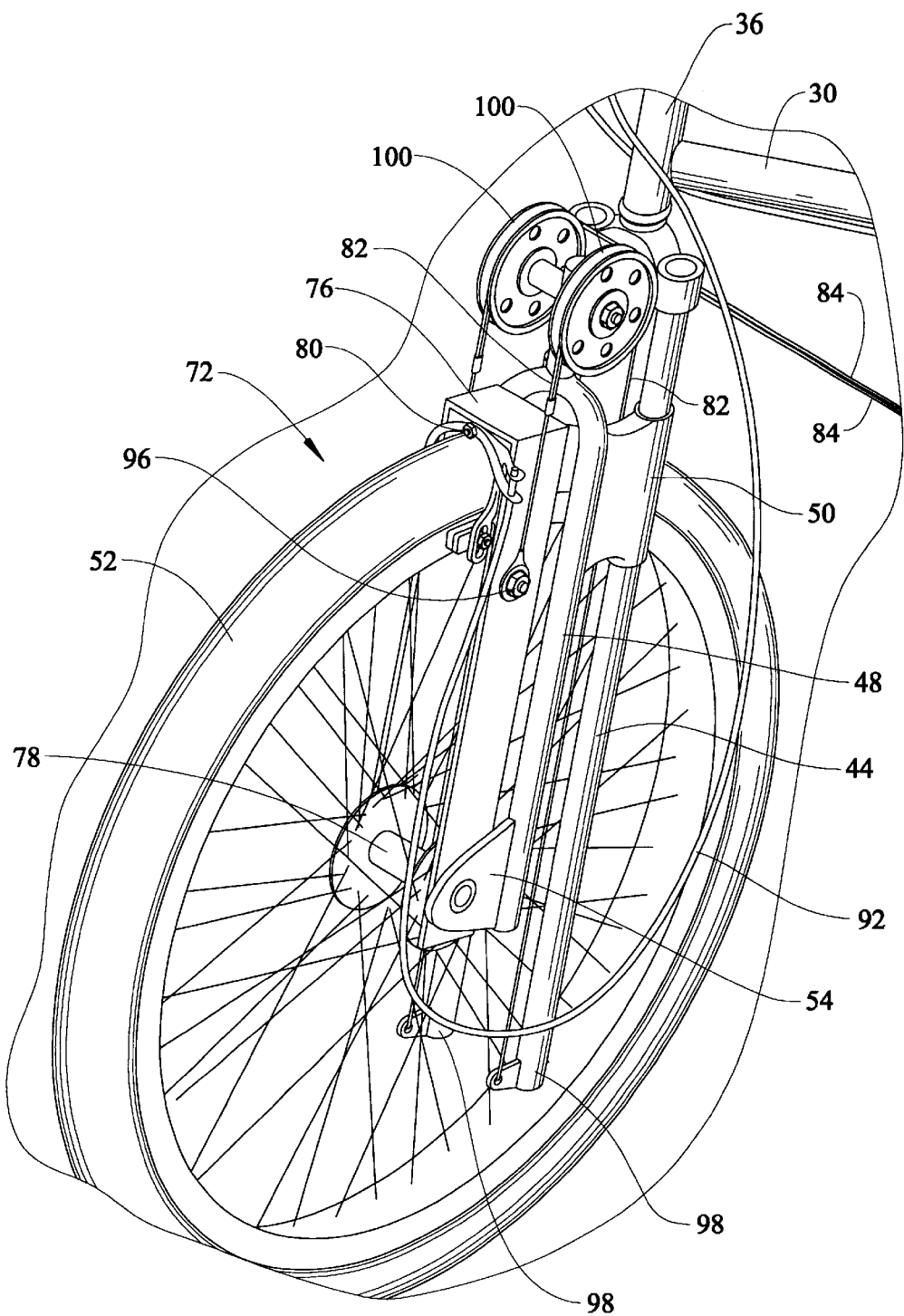
FIG. 5 is a close-up pictorial view of the first wheel mounting assembly of the bicycle shown in FIG. 1.

As seen in FIG. 5, the energy transfer construction 70 employs a pivot yoke 76 mounted on the front wheel axle 78, a caliper-type clamp 80 mounted on the yoke, and a network of cables 82,84,86 that transmit energy throughout the bicycle 10.

The pivot yoke 76, which resembles an inverted "U", straddles the front wheel 52, but does not interfere with the rotation of thereof.

The wheel clamp 80 is operated by a handlebar-mounted clamp lever 88. The handlebars 90, themselves, are secured to the handlebar support post 38 and allow a rider to steer the bicycle 10 during transit. The clamp lever 88 is linked to the clamp 80 via a clamp cable 92; squeezing the clamp lever causes the clamp to engage the front wheel rim 94.

The pivot yoke 76 is linked to other parts of the bicycle 10 by flexible cables 82,84,86. With continued reference to FIG. 5, a pair of front lift cables 82 extends from yoke tethering posts 96 to distal ends 98 of the steering fork 44. These front lift cables 82 are guided by a pair of front pulleys 100 that are rotatably mounted on the wheel fork 48. As seen in FIG. 3, and with additional reference to FIG. 4, a single steering cable 84 extends from the yoke tethering posts 96, continues over the front pulleys 100 and passes around a steering pulley 102 that is suspended below the passenger support construction 12. The steering pulley 102 is, in turn, linked to the passenger support construction down tube 30 by a rear lift cable 86. The rear lift cable 86 passes around a rear pulley 104 and is attached at opposite ends 106,108 to the steering pulley 102 and the passenger support construction down tube 30, respectively. The rear pulley 104 is attached to the second wheel mounting assembly control vertex 62.

During use, the pivot yoke 76, wheel clamp 80, pulleys 100,102,104 and pulleys 82,84,86 cooperate to raise and lower the passenger support construction 12 with respect to the bicycle wheels 52,68. More specifically, squeezing the clamp lever 88 elevates the passenger support construction 12 from a standard position to an elevated, lifting position. Conversely, releasing the clamp lever 88 returns the passenger support construction 12 to the standard position.

The operation of the energy conversion construction 70 will now be described. When the clamp lever 88 is squeezed, the resultant tension produced in the clamp cable 92 causes the wheel clamp 80 to constrict, engaging the front wheel rim 94. As the wheel clamp 80 engages the front wheel rim 94, the pivot yoke 76 begins to rotate in tandem with the front wheel 52. When the pivot yoke 76 travels about the front wheel axle 78, the front lift, steering, and rear lift cables 82,84,86 are placed in tension. As the pivot yoke 76 continues to rotate around the front wheel axle 78, the front lift cables 82 and the steering cable 84 translate with respect to the front pulleys 100. The translation of the front lift cables 82 produces a concomitant upward translation of the steering fork 44 within the linking sleeve 50. Similarly, the translation of the steering cable 84 causes the rear lift cable 86 to translate about the rear pulley 104 causing the second wheel mounting assembly 18 to rotate downward about the support cylinder 66.

The above-described translation of the steering fork 44 and rotation of the second wheel mounting assembly 18 lifts the passenger support construction 12 with respect to the wheels 52, 68. With joint reference to FIGS. 1 and 2, as the clamp lever 88 is released, the wheel clamp 80 disengages the front wheel rim 94 and allows the pivot yoke 76 to return to an equilibrium position. When the pivot yoke 76 comes to rest, tension in the positioning system cables 82,84,86 is released. As a result, the steering fork 44 and second wheel mounting assembly 18 return to their original positions, thus allowing the passenger support construction 12 to descend into its lowered, standard position. To increase the life of the cables 82,84,86, the passenger support construction 12 rests upon bushings, not shown, when the passenger support construction is in the standard position.

The lift characteristics of the bicycle 10 are a product of the front and rear pulleys 100,104. Although the pulleys 100,104 are round in the preferred embodiment, non-circular cams would also suffice. Using non-circular cams would produce lifting speeds that varied throughout the vertical travel of the passenger support construction 12.

In the preferred embodiment, the bicycle 10 is a bicycle, and the above-mentioned pedal crankset 42 is part of a drive system 110 used to motivate the bicycle 10 from one location to another. The drive system 110 also includes a flexible drive band 112, such as a chain or belt, that operatively engages a front drive gear 114 and a rear drive gear 116. As seen in FIG. 1, the front drive gear 114 is linked to the pedal crankset 42, and the rear drive gear 116 is linked to the rear wheel 68. A rider sitting upon the seat 34 operates the pedals 42, thereby rotating the front drive gear 114. This pedaling motion turns the flexible band, or chain 112 and causes rotation of the rear drive gear 115 and the attached rear wheel 68; rear wheel rotation propels the bicycle 10 forward.

A cable-actuated rear brake assembly 118 slows the bicycle 10 by engaging the bicycle rear wheel 68, as directed by the rider. The drive system may also include a chain tensioner 120 to ensure that the drive band 112 remains taut, engaging the drive gears 114,116 as the passenger support construction 12 moves up and down. The drive system 110 may alternatively be a motor-driven chain or shaft. Motor 120 is mounted on the passenger support construction 12 and is connected to the drive system 110 by chain or shaft (not shown).

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. A bicycle comprising: a passenger support construction consisting of a single frame with a first end spaced apart from a second end with a first wheel disposed at said first end and a second wheel disposed at said second end; a steering fork having a handle bar disposed on said single frame first end with a wheel engaging member actuated by a clamp lever mounted on said handle bar; a selective positioning means for providing rider-controlled amounts of vertical movement of said passenger support construction with respect to said wheels; and a positioning system means constructed and arranged to convert rotational energy from one of said wheels into translational energy; whereby said translational energy being responsible for said vertical movement.

2. The bicycle of claim 1, wherein said positioning system means is further defined as an energy conversion construction for converting rotational energy from one of said wheels into translational energy including a first lifting system that cooperates with said energy conversion construction to move said passenger support construction first end with respect to said first wheel; and a second lifting system that cooperates with said energy conversion construction to move said support construction second end with respect to said second wheel, whereby said lifting systems cooperatively harness said translational energy to move said passenger support construction between a first vertical position and a second vertical position.

3. The bicycle of claim 2, wherein said steering fork includes a first end pivotally mounted within a crown tube affixed to said first end of said passenger support construction, and a free second end; a wheel fork having a first end slidably attached to said steering fork second end, and a second end to which said first wheel is rotatably attached; said second wheel having a mounting assembly including a second wheel attachment member having a first end pivotally attached to said second end of said passenger support construction, and a second end to which said second wheel is rotatably attached; and said energy conversion construction comprises a pivot yoke having a free first end and a second end rotatably mounted on a first wheel axle; a wheel engaging member disposed on said pivot yoke; a first flexible member extending between said pivot yoke to said steering fork; and a second flexible member extending between said pivot yoke to said second wheel attachment member;

whereby said pivot yoke rotates about said first wheel axle when said wheel engaging member engages said first wheel, said pivot yoke rotation producing tension within said flexible members and causing relative motion between said passenger support construction and said wheels.

4. The bicycle of claim 3, wherein: said first flexible member is at least one cable having a first end affixed to said pivot yoke and a second end to said steering fork second end, said cable resting on a first guide pulley.

5. The bicycle of claim 3, wherein: said second flexible member is a cable having distal ends affixed to said pivot yoke and a mid portion that passes around a steering pulley, said steering pulley being disposed on said second wheel attachment member.

6. The bicycle of claim 2, wherein said bicycle further includes a motorized drive system.

7. In a bicycle having a passenger support construction with a first end spaced apart from a second end, a first wheel disposed at said first end via a first wheel mounting assembly, and a second wheel disposed at said second end via a second wheel mounting assembly, the improvement comprising:

a selective positioning system for providing rider-controlled amounts of vertical movement of said passenger support construction with respect to said wheels, said positioning system constructed and arranged to convert rotational energy from one of said wheels into translational energy, said translational energy being responsible for said vertical movement wherein said selective positioning system comprises:

an energy conversion construction for converting rotational energy from one of said wheels into translational energy;

a first lifting system that cooperates with said energy conversion construction to move said passenger support construction first end with respect to said first wheel; and a second lifting system that cooperates with said energy conversion construction to move said support construction second end with respect to said second wheel, whereby said lifting systems cooperatively harness said translational energy to move said passenger support construction between a first vertical position and a second vertical position.

8. The bicycle of claim 7, wherein:

said first wheel mounting assembly includes a steering fork having a first end pivotally mounted within a crown tube affixed to said first end of said passenger support construction, and a free second end; a wheel fork having a first end slidably attached to said steering fork second end, and a second end to which said first wheel is rotatably attached;

said second wheel mounting assembly includes a second wheel attachment member having a first end pivotally attached to said second end of said passenger support construction, and a second end to which said second wheel is rotatably attached; and said energy conversion construction comprises a pivot yoke having a free first end and a second end rotatably mounted on a first wheel axle; a wheel engaging member disposed on said pivot yoke; a first flexible member extending between said pivot yoke to said steering fork; and a second flexible member extending between said pivot yoke to said second wheel attachment member;

whereby said pivot yoke rotates about said first wheel axle when said wheel engaging member engages said first wheel, said pivot yoke rotation producing tension within said flexible members and causing relative motion between said passenger support construction and said wheels.

9. The bicycle of claim 8, wherein:

said steering fork includes a handle bar disposed on said steering fork first end; and said wheel engaging member is a caliper clamp, said clamp being actuated by a clamp lever mounted on said handle bar.

10. The bicycle of claim 8, wherein:

said first flexible member is at least one cable having a first end affixed to said pivot yoke and a second end to said steering fork second end, said cable resting on a first guide pulley.

11. The bicycle of claim 8, wherein:

said second flexible member is a cable having distal ends affixed to said pivot yoke and a mid portion that passes around a steering pulley, said steering pulley being disposed on said second wheel attachment member.

12. The bicycle of claim 8, wherein said bicycle further includes a motorized drive system.

* * * * *